US012747776B2

(12) United States Patent
Landry-Drolet et al.

(10) Patent No.: US 12,747,776 B2
(45) Date of Patent: Sep. 29, 2026

(54) CLUTCH ASSEMBLY FOR AN AIRCRAFT PROPULSION SYSTEM GEAR TRAIN

(71) Applicant: Pratt & Whitney Canada Corp., Longueuil (CA)

(72) Inventors: Guillaume Landry-Drolet, Boucherville (CA); Michel Desjardins, Saint-Hubert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/891,893

(22) Filed: Sep. 20, 2024

(65) Prior Publication Data

US 2026/0085741 A1 Mar. 26, 2026

(51) Int. Cl.

*F16H 1/22* (2006.01)
*B64D 35/00* (2006.01)
*F16D 41/069* (2006.01)
*F16H 57/021* (2012.01)
*F16H 57/02* (2012.01)

(52) U.S. Cl.

CPC ............... *F16H 1/22* (2013.01); *B64D 35/00* (2013.01); *F16D 41/069* (2013.01); *F16H 57/021* (2013.01); *F16H 2057/02043* (2013.01)

(58) Field of Classification Search

CPC ...... B64D 35/00; F16D 41/069; F16H 57/021
See application file for complete search history.

(56) References Cited

U.S. PATENT DOCUMENTS 9,951,825 B2 4/2018 Darrow
10,793,284 B2 10/2020 Prater
11,708,868 B2 7/2023 Olson
12,352,323 B1 * 7/2025 Olson ...................... B64C 27/14
2004/0188214 A1 * 9/2004 Muramatsu ........... F16D 41/088 192/113.32
2015/0176427 A1 * 6/2015 Denis .................... F01D 21/045 60/779

(Continued)

FOREIGN PATENT DOCUMENTS

CN 115435026 A * 12/2022 ......... F16H 57/0006
EP 3333073 B1 * 3/2019 ............. B64C 27/12
WO WO-2022131247 A1 * 6/2022 ............... F16H 1/14

OTHER PUBLICATIONS

EP Search Report for EP Patent Application No. 25203770.0 dated Jun. 5, 2026.

*Primary Examiner* — Stacey A Fluhart
(74) *Attorney, Agent, or Firm* — Getz Balich LLC

(57) ABSTRACT

A gear train includes an output shaft, a clutch assembly, and an output gear roller bearing. The output shaft is configured for rotation about a rotational axis. The clutch assembly includes an inner ring-shaft, an output gear, a clutch, and a clutch ball bearing. The inner ring-shaft extends between and to a first outer radial side and a first inner radial side. The inner ring-shaft is mounted on the output shaft at the first inner radial side. The output gear includes an outer ring. The outer ring extends between and to a second outer radial side and a second inner radial side. The clutch is disposed between the outer ring and the inner ring-shaft. The clutch ball bearing is disposed between the first outer radial side and the second inner radial side. The output gear roller bearing is in rolling engagement with the outer ring on the second outer radial side.

12 Claims, 4 Drawing Sheets

(56) References Cited

U.S. PATENT DOCUMENTS

| | | | | |
|---|---|---|---|---|
| 2018/0163795 | A1 | 6/2018 | Olson | |
| 2023/0243276 | A1 * | 8/2023 | Quintin | F16C 19/54<br>415/229 |

* cited by examiner

CLUTCH ASSEMBLY FOR AN AIRCRAFT PROPULSION SYSTEM GEAR TRAIN

TECHNICAL FIELD

This disclosure relates generally to clutch assemblies for an aircraft propulsion system gear train.

BACKGROUND OF THE ART

A propulsion system for an aircraft may include a gear train configured to transmit rotational energy from an engine to one or more propulsor rotors of the aircraft. Various aircraft propulsion system gear trains are known in the art. While these known gear trains may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a gear train for an aircraft propulsion system includes an output shaft, a clutch assembly, and an output gear roller bearing. The output shaft is configured for rotation about a rotational axis. The clutch assembly includes an integrated inner ring-shaft, an output gear, a clutch, and a clutch ball bearing. The integrated inner ring-shaft extends circumferentially about the rotational axis. The integrated inner ring-shaft extends between and to a first outer radial side and a first inner radial side. The integrated inner ring-shaft is mounted on the output shaft at the first inner radial side. The output gear includes an outer ring extending circumferentially about the rotational axis. The outer ring extends between and to a second outer radial side and a second inner radial side. The clutch includes a plurality of clutch members. The plurality of clutch members are disposed between the outer ring and the integrated inner ring-shaft. The plurality of clutch members are configured to selectively couple the outer ring with the integrated inner ring-shaft. The clutch ball bearing includes an inner race, an outer race, and a plurality of ball bearing elements. The inner race is mounted on the first outer radial side. The outer race is mounted on the second inner radial side. The plurality of ball bearing elements are retained between the inner race and the outer race. The output gear roller bearing includes a plurality of roller bearing elements in rolling engagement with the outer ring on the second outer radial side. The clutch assembly is axially moveable relative to the output gear roller bearing.

In any of the aspects or embodiments described above and herein, the output gear may extend between and to an inner radial end and an outer radial end, the output gear may include the outer ring at the inner radial end, and the output gear may include a gear pattern at the outer radial end.

In any of the aspects or embodiments described above and herein, the gear pattern may be a spur gear pattern.

In any of the aspects or embodiments described above and herein, the integrated inner ring-shaft may extend between and to a first axial end and a second axial end, and the inner ring-shaft may be axially retained by the output shaft at the first axial end and the second axial end.

In any of the aspects or embodiments described above and herein, the gear train may further include a gearbox housing, the gearbox housing may house the output shaft assembly and the clutch assembly, and the output gear roller bearing may be mounted on the gearbox housing.

In any of the aspects or embodiments described above and herein, the gear train may further include a first output shaft bearing assembly, and the first output shaft bearing assembly may include a ball bearing mounted on and between the gearbox housing and the output shaft.

In any of the aspects or embodiments described above and herein, the gear train may further include a second output shaft bearing assembly, and the second output shaft bearing assembly may include a roller bearing mounted on and between the gearbox housing and the output shaft.

In any of the aspects or embodiments described above and herein, the plurality of clutch members may include a plurality of sprags.

In any of the aspects or embodiments described above and herein, the clutch assembly may include two of the clutch ball bearing as a first clutch ball bearing and a second clutch ball bearing, and the clutch may be disposed axially between the first clutch ball bearing and the second clutch ball bearing.

In any of the aspects or embodiments described above and herein, the first clutch ball bearing and the second clutch ball bearing may form a duplex bearing arrangement.

According to another aspect of the present disclosure, a gear train for an aircraft propulsion system includes a gearbox housing, an output shaft, a clutch assembly, a first output shaft bearing assembly, and a second output shaft bearing assembly. The output shaft is mounted for rotation within the gearbox housing about a rotational axis. The clutch assembly is axially moveable relative to the gearbox housing. The clutch assembly includes an output gear and a clutch. The output gear extends circumferentially about the rotational axis. The clutch includes a plurality of clutch members. The plurality of clutch members are selectively coupling the output gear with the output shaft. The first output shaft bearing assembly is mounted on the housing on a first axial side of the clutch assembly. The first output shaft bearing assembly rotationally supports the output shaft. The second output shaft bearing assembly is mounted on the housing on a second axial side of the clutch assembly, opposite the first axial side. The second output shaft bearing assembly rotationally supports the output shaft.

In any of the aspects or embodiments described above and herein, the first output shaft bearing assembly may include a duplex ball bearing.

In any of the aspects or embodiments described above and herein, the second output shaft bearing assembly may include a roller bearing.

In any of the aspects or embodiments described above and herein, the output gear may be a spur gear.

In any of the aspects or embodiments described above and herein, the clutch assembly may further include an intermediate shaft mounted on and circumscribing the output shaft. The intermediate shaft may be axially retained by the output shaft. The plurality of clutch members may be disposed between the intermediate shaft and the output gear to selectively couple the output gear with the output shaft through the intermediate shaft.

According to another aspect of the present disclosure, a method for isolating a clutch assembly of a gear train of an aircraft propulsion system from external aircraft loads includes driving rotation of an output shaft with the clutch assembly including an output gear, a clutch, and an intermediate shaft, the clutch operable to selectively couple the output gear with the intermediate shaft, the intermediate shaft mounted on the output shaft, axially retaining the output shaft with an output shaft bearing assembly mounted on the output shaft and on a gearbox housing of the gear train, axially and radially locating the output gear relative to the intermediate shaft with a clutch ball bearing including an inner race, an outer race, and a plurality of bearing elements retained between the inner race and the outer race, the inner race mounted on the intermediate shaft, the outer race mounted on the output gear, and isolating the clutch assembly from the external aircraft loads with an output gear roller bearing mounted on the gearbox housing and connected in rolling engagement with the output gear by permitting axial and radial movement of the clutch assembly relative to the output shaft.

In any of the aspects or embodiments described above and herein, the method may further include driving rotation of a propulsor rotor of the aircraft propulsion system with the output shaft.

In any of the aspects or embodiments described above and herein, the method may further include decoupling the intermediate shaft from the output gear with the clutch.

In any of the aspects or embodiments described above and herein, the method may further include transferring the external aircraft loads to the gearbox housing through the output shaft bearing assembly.

In any of the aspects or embodiments described above and herein, the output shaft bearing assembly may include a duplex ball bearing.

The present disclosure, and all its aspects, embodiments and advantages associated therewith will become more readily apparent in view of the detailed description provided below, including the accompanying drawings.

DETAILED DESCRIPTION

Figure 1:
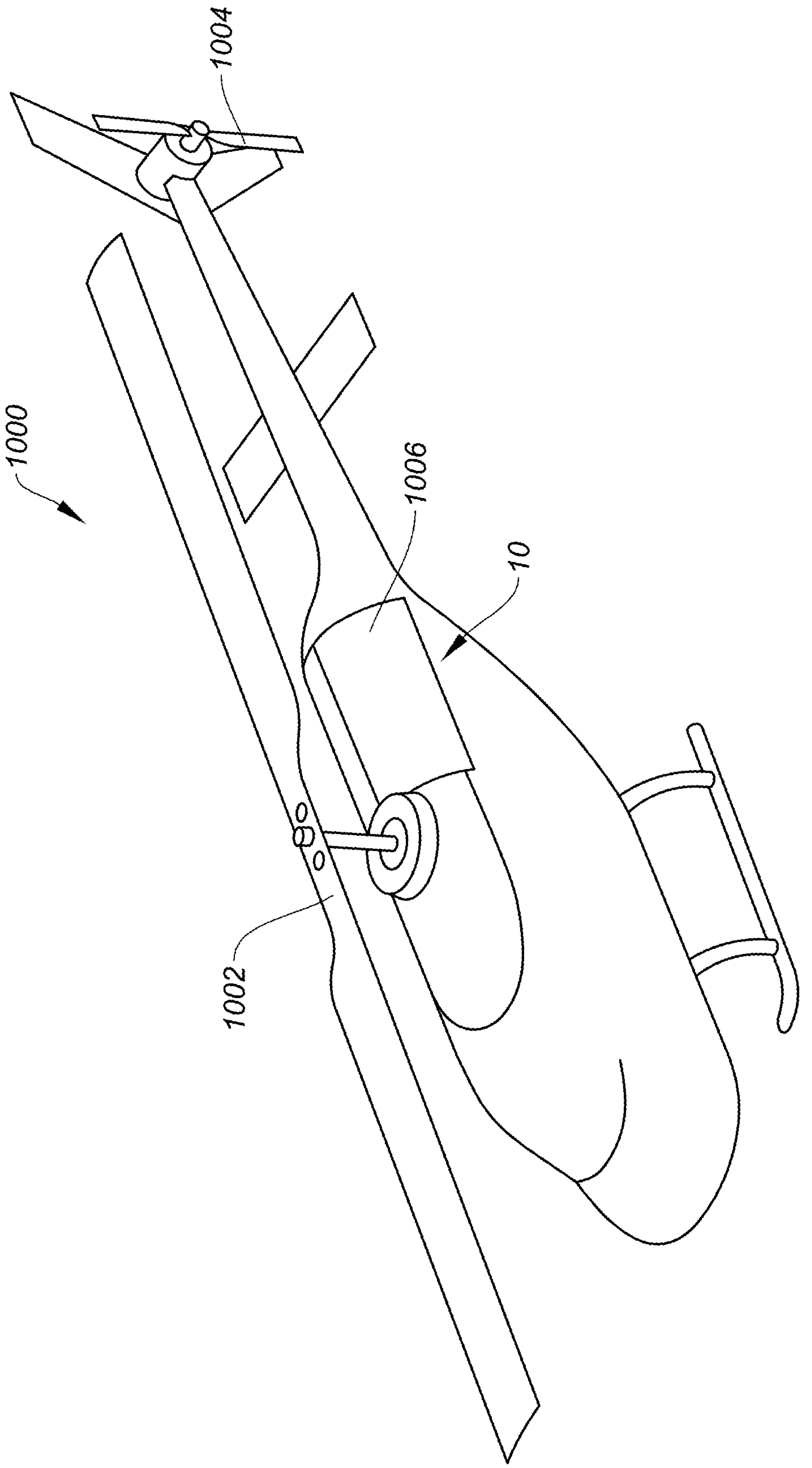
FIG. 1 illustrates a perspective view of an aircraft including a propulsion system, in accordance with one or more embodiments of the present disclosure.

FIG. 1 illustrates a perspective view of an aircraft 1000 including a propulsion system 10. The aircraft 1000 of FIG. 1 is configured as a rotary-wing aircraft (e.g., a helicopter). The present disclosure, however, is also applicable to other configurations of aircraft such as, but not limited to, a fixed-wing aircraft (e.g., an airplane), a tilt-rotor aircraft, a tilt-wing aircraft, or another aerial vehicle. The propulsion system 10 of FIG. 1 is configured to drive rotation of a main rotor 1002 and a tail rotor 1004 of the aircraft 1000 to facilitate propulsion for the aircraft 1000. The aircraft 1000 of FIG. 1 further includes a housing 1006 (e.g., a nacelle, a fuselage, etc.) enclosing and forming a protective outer covering for the propulsion system 10.

Figure 2:
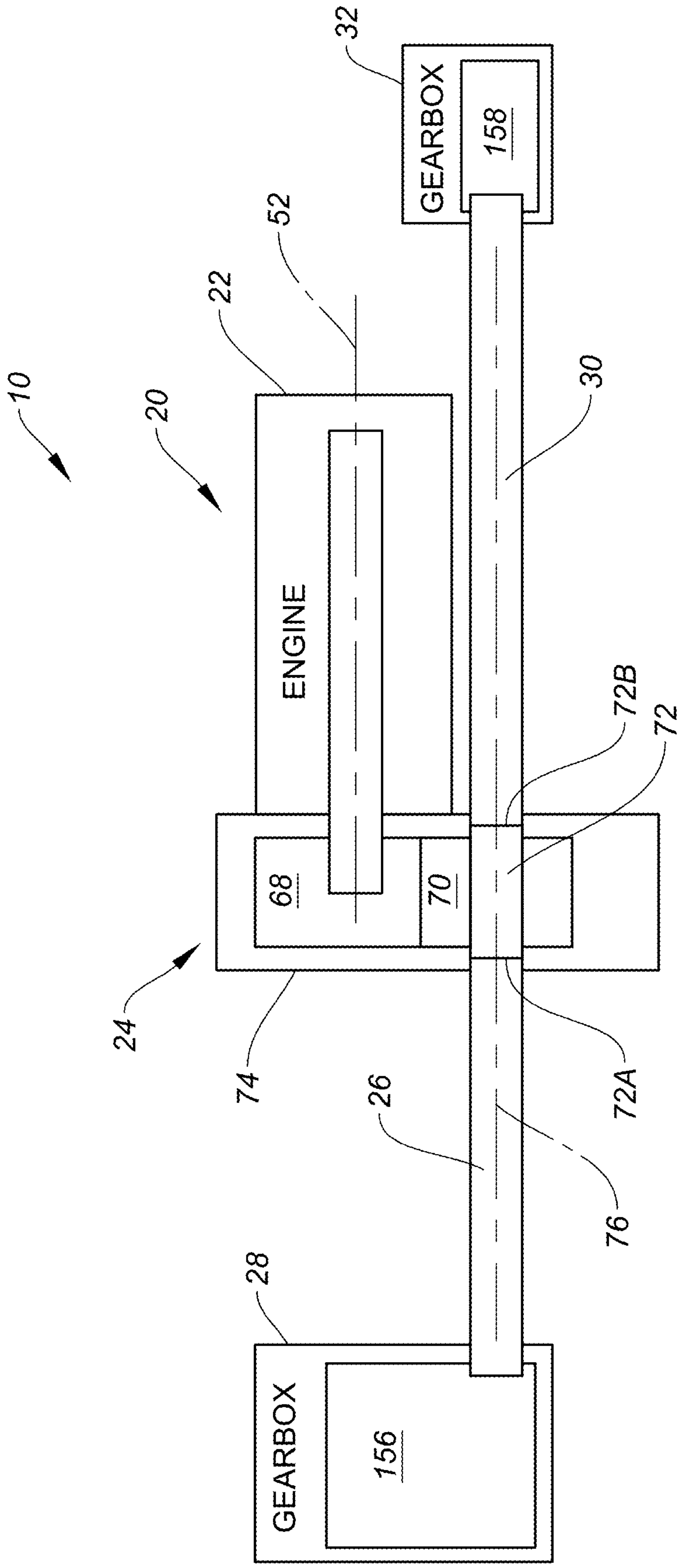
FIG. 2 schematically illustrates a side view of an engine assembly for an aircraft propulsion system, in accordance with one or more embodiments of the present disclosure.

FIG. 2 schematically illustrates a cutaway, side view of the propulsion system 10. The propulsion system 10 of FIG. 2 includes an engine assembly 20. The engine assembly 20 includes a gas turbine engine 22, an engine transmission gear train 24, a main rotor drive shaft 26, a main rotor gearbox 28, a tail rotor drive shaft 30, and a tail rotor gearbox 32.

Figure 3:
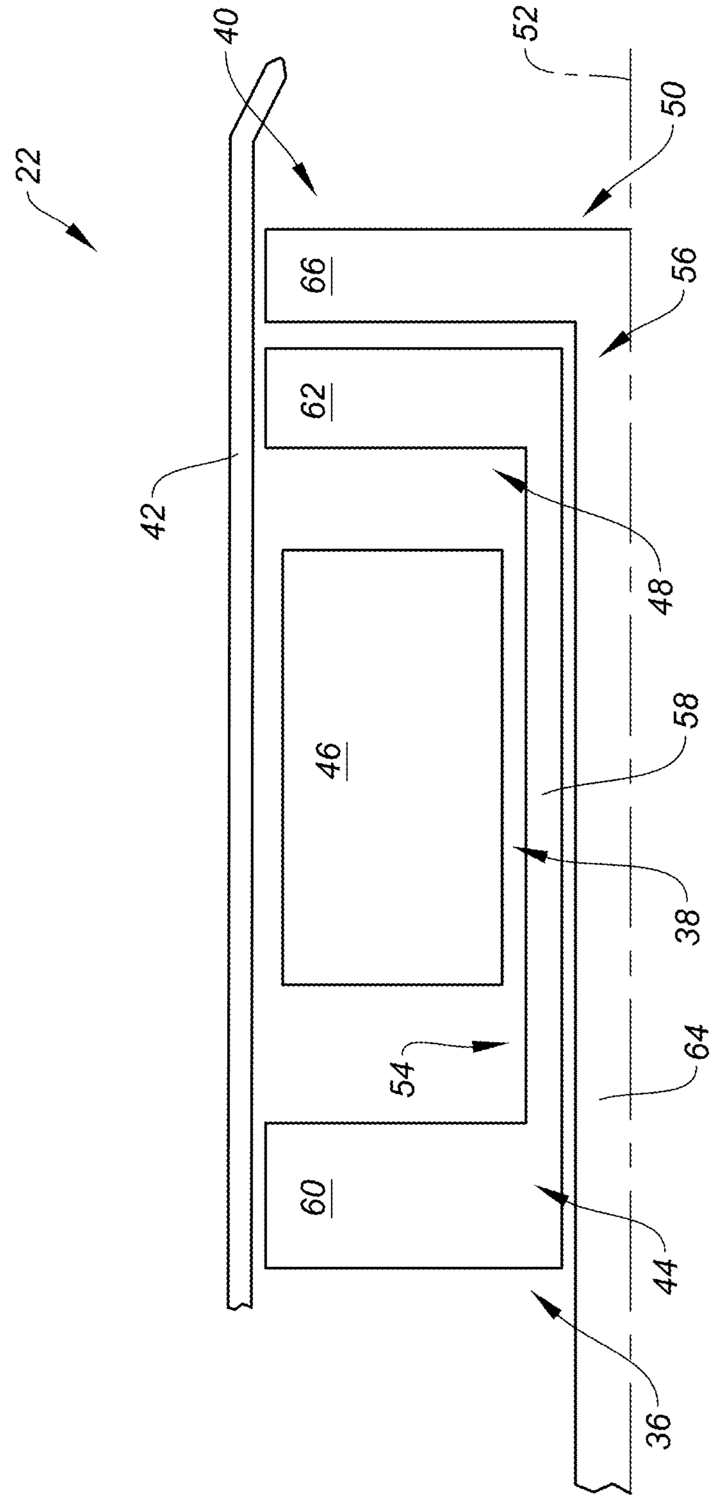
FIG. 3 schematically illustrates a side, cutaway view of a gas turbine engine for an aircraft propulsion system, in accordance with one or more embodiments of the present disclosure.

FIG. 3 schematically illustrates a cutaway, side view of the gas turbine engine 22. The gas turbine engine 22 of FIG. 3 includes a compressor section 36, a combustor section 38, a turbine section 40, and an engine static structure 42. The compressor section 36 includes a compressor 44. The combustor section 38 includes a combustor 46 (e.g., an annular combustor). The turbine section 40 includes a high-pressure turbine 48 and a power turbine 50. The gas turbine engine 22 sections 36, 38, 40 of FIG. 3 are sequentially arranged along a rotational axis 52 (e.g., an axial centerline) of the gas turbine engine 22. The engine static structure 42 may include, for example, one or more engine cases for the gas turbine engine 22. The engine static structure 42 may additionally include cowlings, bearing assemblies, or other structural components of the gas turbine engine 22. The engine static structure 42 houses and structurally supports the engine sections 36, 38, 40.

Components of the engine sections 26, 28, 30 form a first rotational assembly 54 (e.g., a high-pressure spool) and a second rotational assembly 56. The first rotational assembly 54 and the second rotational assembly 56 are mounted for rotation about the rotational axis 52 relative to the engine static structure 42.

The first rotational assembly 54 includes a first shaft 58, a bladed compressor rotor 60 for the compressor 44, and a bladed first turbine rotor 62 for the high-pressure turbine 48. The first shaft 58 interconnects the bladed compressor rotor 60 and the bladed first turbine rotor 62.

The second rotational assembly 56 includes a second shaft 64 and a bladed second turbine rotor 66 for the power turbine 50. The second shaft 64 is a power shaft (e.g., an engine output shaft) of the gas turbine engine 22. The second shaft 64 interconnects the bladed second turbine rotor 66 with the engine transmission gear train 24. The first shaft 58 and the second shaft 64 are concentric and configured to rotate about the rotational axis 52. The present disclosure, however, is not limited to concentric configurations of the first shaft 58 and the second shaft 64.

During operation of the gas turbine engine 22, ambient air is directed into the compressor section 36 by the air intake 34. The air is compressed in the compressor 44 by the bladed compressor rotor 60 and directed into a combustion chamber of the combustor 46. Fuel is injected into the combustion chamber and mixed with the compressed air to provide a fuel-air mixture. This fuel-air mixture is ignited, and combustion products thereof flow through and sequentially cause the bladed first turbine rotor 62 and the bladed second turbine rotor 66 to rotate. The rotation of the bladed first turbine rotor 62 and the bladed second turbine rotor 66 respectively drives rotation of the first rotational assembly 54 and the second rotational assembly 56.

Figure 4:
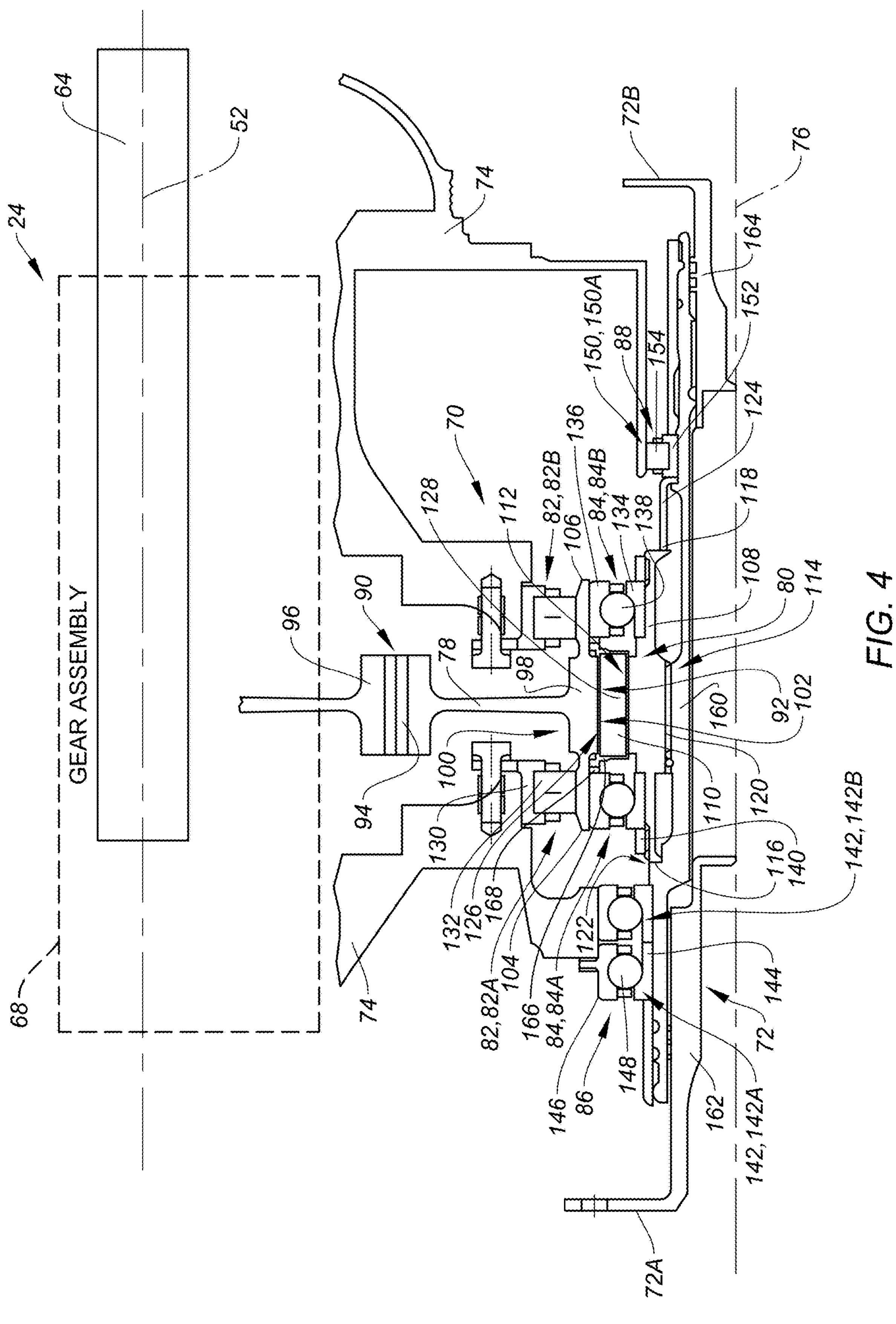
FIG. 4 schematically illustrates a cutaway, side view of a portion of an engine transmission gear train for the engine assembly of FIG. 2, in accordance with one or more embodiments of the present disclosure.

Referring again to FIG. 2 and with additional reference to FIG. 4, the engine transmission gear train 24 is operably connected to (e.g., coupled with) the second shaft 64, the main rotor drive shaft 26, and the tail rotor drive shaft 30. The gas turbine engine 22 is configured to drive rotation of the main rotor drive shaft 26 and the tail rotor drive shaft 30 with the second shaft 64 through the engine transmission gear train 24. The engine transmission gear train 24 of FIG. 2 includes a speed-changing gear assembly 68, a clutch assembly 70, an output shaft assembly 72, and a gearbox housing 74. The gear assembly 68 is coupled with and between the second shaft 64 and the clutch assembly 70. The gear assembly 68 may be configured, for example, as an offset gear assembly, an epicyclic gear assembly (e.g., a planetary gear assembly), or another suitable gear assembly for transmitting rotation of the second shaft 64 to the output shaft assembly 72 (e.g., through the clutch assembly 70) at a different (e.g., reduced) rotational speed. The present disclosure, however, is not limited to any particular gear configuration for the gear assembly 68.

The clutch assembly 70, as will be discussed in further detail below, is coupled with and between the gear assembly 68 and the output shaft assembly 72. The output shaft assembly 72 is rotatable about a rotational axis 76. The output shaft assembly 72 extends between and to a first axial end 72A of the output shaft assembly 72 and a second axial end 72B of the output shaft assembly 72. The output shaft assembly 72 of FIG. 4 includes an output shaft 160, a first coupling 162, and a second coupling 164. The first coupling 162 is mounted on the output shaft 160 (e.g., by a splined interface) and forms the first axial end 72A. The second coupling 164 is mounted on the output shaft 160 (e.g., by a splined interface) and forms the second axial end 72B. Of course, the present disclosure may include alternative configurations of the output shaft assembly 72 which do not include the first coupling 162 and/or the second coupling 164. The output shaft assembly 72 is fixedly mounted to the main rotor drive shaft 26 (e.g., by the first coupling 162 at the first axial end 72A) and the tail rotor drive shaft 30 (e.g., by the second coupling 164 at the second axial end 72B). The output shaft assembly 72 is configured to drive rotation of the main rotor drive shaft 26 and the tail rotor drive shaft 30 about the rotational axis 76. The housing 74 surrounds and supports (e.g., rotationally supports) components of the engine transmission gear train 24 including the gear assembly 68, the clutch assembly 70, and the output shaft assembly 72.

FIG. 4 illustrates a cutaway, side view of the engine transmission gear train 24 including the clutch assembly 70 and the output shaft assembly 72. The clutch assembly 70 of FIG. 4 includes an output gear 78, an integrated inner ring-shaft 108, a clutch 80, and clutch bearing assemblies 84. The gear train 24 further includes output gear bearings 82. The gear train 24 may additionally include a first output shaft bearing assembly 86 and/or a second output shaft bearing assembly 88.

The output gear 78 extends circumferentially about (e.g., completely around) the rotational axis 76. The output gear 78 extends (e.g., radially extends) between and to an outer radial end 90 of the output gear 78 and an inner radial end 92 of the output gear 78. The output gear 78 includes a spur gear pattern 94 (e.g., spur gear teeth) on the outer radial end 90. The spur gear pattern 94 is engaged with (e.g., meshed with) a spur gear 96 of the gear assembly 68 such that rotation of the spur gear 96 drives rotation of the output gear 78 about the rotational axis 76. The output gear 78 forms or otherwise includes an outer ring 98, for the clutch 80, at (e.g., on, adjacent, or proximate) the inner radial end 92. The outer ring 98 extends circumferentially about (e.g., completely around) the rotational axis 76. The outer ring 98 extends (e.g., radially extends) between and to an outer radial side 100 of the outer ring 98 and an inner radial side 102 of the outer ring 98. The outer ring 98 extends (e.g., axially extends) between and to a first axial end 104 of the outer ring 98 and a second axial end 106 of the outer ring 98.

The integrated inner ring-shaft 108 forms an inner ring for the clutch 80, radially opposite the clutch 80 from the outer ring 98. The inner ring-shaft 108 additionally forms an intermediate shaft of the output shaft assembly 72 mounted on and circumscribing the output shaft 160. The inner ring-shaft 108 extends (e.g., radially extends) between and to an outer radial side 112 of the inner ring-shaft 108 and an inner radial side 114 of the inner ring-shaft 108. The inner ring-shaft 108 extends (e.g., axially extends) between and to a first axial end 116 of the inner ring-shaft 108 and a second axial end 118 of the inner ring-shaft 108. The inner ring-shaft 108 (e.g., the inner radial side 114) is selectively couplable with the outer ring 98 by operation of the clutch 80. The inner ring-shaft 108 is engaged with the output shaft 160 by a free spline coupling 120 formed by and between the inner ring-shaft 108 and the output shaft 160. The inner ring-shaft 108 is mounted on the output shaft 160. The inner ring-shaft 108 is axially retained by the output shaft 160 at (e.g., on, adjacent, or proximate) the first axial end 116 and the second axial end 118. For example, the first axial end 116 of FIG. 4 is disposed axially abutting a shoulder 122 formed by the output shaft assembly 72. The second axial end 118 of FIG. 4 is disposed axially abutting an axial spacer 124 extending axially between the second axial end 118 and the second output shaft bearing assembly 88. Axial retention of the inner ring-shaft 108 by the output shaft 160 axially traps the inner ring-shaft 108 on and relative to the output shaft 160 while still allowing some limited axial movement of the inner ring-shaft 108 relative to the output shaft 160. The interface between the inner ring-shaft 108 and the output shaft 160 on the first axial end 116, the second axial end 118, and the free spline coupling 120 may additionally facilitate some limited radial movement of the inner ring-shaft 108 relative to the output shaft 160, thereby facilitating isolation of components of the clutch assembly 70 from external aircraft loads (e.g., radial loads) which may be experienced at the rotors 1002, 1004 and transferred into and through the output shaft assembly 72. The present disclosure, however, is not limited to the foregoing exemplary axial mounting configuration of the first axial end 116 and the second axial end 118.

The clutch 80 is positioned between (e.g., radially between) the outer ring 98 and the inner ring-shaft 108. The clutch 80 includes clutch members 110. The clutch members 110 are disposed radially between and contacting the outer ring 98 and the inner ring-shaft 108. The clutch members 110 are configured to selectively couple the inner ring-shaft 108 with the outer ring 98 or to decouple the inner ring-shaft 108 from the outer ring 98. The clutch 80 of FIG. 4 is configured, for example, as a sprag clutch 126 with the clutch members 110 including a plurality of sprags 128 positioned between and contacting the outer ring 98 and the inner ring-shaft 108. The sprag clutch 126 is a one-way freewheel clutch configured to facilitate coupling of the inner ring-shaft 108 and the outer ring 98 for a first rotational direction of the outer ring 98 and to facilitate decoupling of the inner ring-shaft 108 and from the outer ring 98 for an opposite second rotational direction of the outer ring 98. Accordingly, the sprag clutch 126 may facilitate freewheeling of the output shaft assembly 72 (and the drive shafts 26, 30) during autorotation of the main rotor 1002 and the tail rotor 1004 (see FIG. 1).

The clutch bearings 84 of FIG. 4 include a first clutch bearing 84A (e.g., a first axial bearing) and a second clutch bearing 84B (e.g., a second axial bearing) forming a duplex bearing arrangement (e.g., a face-to-face arrangement) of the clutch bearings 84. The clutch bearings 84, 84A-B each include an inner race 134, an outer race 136, and a plurality of ball bearing elements 138. The clutch bearings 84, 84A-B may additionally include a retainer 166 and/or a spacer 168.

The inner race 134 and the outer race 136 extend circumferentially about (e.g., completely around) the rotational axis 76. The inner race 134 is mounted on the inner ring-shaft 108 at (e.g., on, adjacent, or proximate) the outer radial side 112. For example, the inner race 134 of FIG. 4 is fixedly mounted on the inner ring-shaft 108 by a nut 140 engaged (e.g., threaded) on the inner ring-shaft 108. The outer race 136 is disposed at (e.g., on, adjacent, or proximate) the outer ring 98 along the inner radial side 102. The ball bearing elements 138 are retained between (e.g., radially between) the inner race 134 and the outer race 136. The retainer 166 and the spacer 168 may be disposed axially between the clutch bearings 84 on one end and the outer ring 98, the clutch 80, and the inner ring-shaft 108 on the other side, for example, to facilitate axial locating of the outer ring 98 relative to the inner ring-shaft 108. The first clutch bearing 84A is disposed at (e.g., on, adjacent, or proximate) the first axial end 104 and the first axial end 116. The second clutch bearing 84B is disposed at (e.g., on, adjacent, or proximate) the second axial end 106 and the second axial end 118. As shown in FIG. 4, the clutch members 110 may be disposed between (e.g., axially between) the first clutch bearing 84A and the second clutch bearing 84B. The clutch bearings 84, 84A-B locate (e.g., axially and radially locate) the outer ring 98 and the inner ring-shaft 108 relative to one another.

The housing includes output gear bearings 82. The output gear bearings 82 are positioned on the outer ring 98 along the outer radial side 100 to rotationally support the output gear 78. The output gear bearings 82 of FIG. 4 include a first output gear bearing 82A (e.g., a first axial bearing) and a second output gear bearing 82B (e.g., a second axial bearing). The output gear bearings 82, 82A-B each include an outer race 130 and a plurality of roller bearing elements 132 (e.g., cylindrical bearing elements). The outer race 130 extends circumferentially about (e.g., completely around) the rotational axis 76. The outer race 130 is mounted at (e.g., on, adjacent, or proximate) the gearbox housing 74. The roller bearing elements 132 are retained within the outer race 130. The roller bearing elements 132 are positioned in rolling engagement with the outer ring 98 along the outer radial side 100, which outer radial side 100 may form an inner race of the output gear bearings 82, 82A-B. The first output gear bearing 82A is disposed on the outer ring 98 at (e.g., on, adjacent, or proximate) the first axial end 104. The second output gear bearing 82B is disposed on the outer ring 98 at (e.g., on, adjacent, or proximate) the second axial end 106. The engagement between the roller bearing elements 132 and the outer ring 98 facilitates (e.g., permits) at least some axial movement of the clutch assembly 70, relative to the gearbox housing 74 and, particularly, in combination with a spur gear configuration of the output gear 78 (e.g., the output gear 78 including the spur gear pattern 94). This configuration of the clutch assembly 70 facilitates isolation of components of the clutch assembly 70, including the clutch 80 and the output gear 78, from external aircraft loads (e.g., axial loads) which may be experienced at the rotors 1002, 1004 and transferred into and through the output shaft assembly 72.

The first output shaft bearing assembly 86 is disposed on the output shaft 160, for example, axially between the first axial end 72A and the clutch 80. The first output shaft bearing assembly 86 includes one or more bearings 142. For example, the first output shaft bearing assembly 86 of FIG. 4 includes a first ball bearing 142A and a second ball bearing 142B forming a duplex bearing arrangement (e.g., a face-to-face arrangement) of the bearings 142. The first ball bearing 142A and the second ball bearing 142B may be disposed axially adjacent and/or axially abutting one another. The present disclosure, however, is not limited to the foregoing exemplary configuration of the first output shaft bearing assembly 86 of FIG. 4. Each of the bearings 142 of FIG. 4 includes an inner race 144, an outer race 146, and a plurality of ball bearing elements 148. The inner race 144 and the outer race 146 extend circumferentially about (e.g., completely around) the rotational axis 76. The inner race 144 is mounted on the output shaft 160. The outer race 146 is mounted at (e.g., on, adjacent, or proximate) the gearbox housing 74. The ball bearing elements 148 are retained between (e.g., radially between) the inner race 144 and the outer race 146. The first output shaft bearing assembly 86 facilitates transferring (e.g., reacting) external aircraft loads (e.g., axial loads) directly to the gearbox housing 74 as well as axially and radially locating the output shaft 160.

The second output shaft bearing assembly 88 is disposed on the output shaft 160, for example, at (e.g., on, adjacent, or proximate) the second axial end 72B and/or axially between the second axial end 72B and the clutch 80. The second output shaft bearing assembly 88 includes one or more bearings 150. For example, the second output shaft bearing assembly 88 of FIG. 4 includes a roller bearing 150A. The present disclosure, however, is not limited to the foregoing exemplary configuration of the second output shaft bearing assembly 88 of FIG. 4. The roller bearing 150A includes an inner race 152 and a plurality of roller bearing elements 154 (e.g., cylindrical bearing elements). The inner race 152 extends circumferentially about (e.g., completely around) the rotational axis 76. The inner race 152 is mounted on the output shaft 160. The roller bearing elements 154 are retained within the inner race 152. The roller bearing elements 154 are positioned in rolling engagement with the gearbox housing 74. The second output shaft bearing assembly 88 facilitates transferring (e.g., reacting) external aircraft loads (e.g., axial loads) directly to the gearbox housing 74 as well as radially locating the output shaft 160.

Referring again to FIG. 2, the main rotor drive shaft 26 operably interconnects (e.g., couples) the engine transmission gear train 24 (e.g., the output shaft assembly 72) with the main rotor gearbox 28. The main rotor drive shaft 26 extends along the rotational axis 76 between and to the engine transmission gear train 24 and the main rotor gearbox 28. The main rotor drive shaft 26 is coupled with a gear assembly 156 of the main rotor gearbox 28. The gear assembly 156 is further operably connected to (e.g., coupled with) the main rotor 1002 (see FIG. 1) to drive rotation of the main rotor 1002 in response to rotation of the main rotor drive shaft 26.

The tail rotor drive shaft 30 operably interconnects (e.g., couples) the engine transmission gear train 24 (e.g., the output shaft assembly 72) with the tail rotor gearbox 32. The tail rotor drive shaft 30 extends along the rotational axis 76 between and to the engine transmission gear train 24 and the tail rotor gearbox 32. The tail rotor drive shaft 30 is coupled with a gear assembly 158 of the tail rotor gearbox 32. The gear assembly 158 is further operably connected to (e.g., coupled with) the tail rotor 1004 (see FIG. 1) to drive rotation of the tail rotor 1004 in response to rotation of the tail rotor drive shaft 30.

During operation of the propulsion system 10, rotation of the second shaft 64 drives rotation of the output gear 78 through the gear assembly 68 (e.g., at a reduced rotational speed relative to the second shaft 64). The clutch 80 selectively couples the output gear 78 with the output shaft 160.

For example, in a first rotational direction of the output gear 78 (e.g., about the rotational axis 76), the clutch 80 may couple the output gear 78 with the output shaft 160 to drive rotation of the output shaft 160 and, in turn, the rotor drive shafts 26, 30 to drive rotation of the main rotor 1002 and the tail rotor 1004. In a second rotational direction of the output gear 78, the clutch may decouple the output gear 78 from the output shaft 160 to permit autorotation of the main rotor 1002 and the tail rotor 1004. The gear train 24 of the present disclosure facilitates isolation of the clutch assembly 70 from external aircraft 1000 loads applied to the main rotor 1002 and/or the tail rotor 1004. Moreover, the clutch assembly 70 of the present disclosure facilitates axial retention of the output gear 78 (e.g., a spur gear) without the need to use the bearings 82, 84 for axial support.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A gear train for an aircraft propulsion system, the gear train comprising:

an output shaft configured for rotation about a rotational axis;

a clutch assembly including an integrated inner ring-shaft, an output gear, a clutch, and a clutch ball bearing, the integrated inner ring-shaft extending circumferentially about the rotational axis, the integrated inner ring-shaft extending between and to a first outer radial side and a first inner radial side, the integrated inner ring-shaft mounted on the output shaft at the first inner radial side;

the output gear including an outer ring extending circumferentially about the rotational axis, the outer ring extending between and to a second outer radial side and a second inner radial side, the clutch including a plurality of clutch members, the plurality of clutch members disposed between the outer ring and the integrated inner ring-shaft, the plurality of clutch members configured to selectively couple the outer ring with the integrated inner ring-shaft, and the clutch ball bearing including an inner race, an outer race, and a plurality of ball bearing elements, the inner race mounted on the first outer radial side, the outer race mounted on the second inner radial side, the plurality of ball bearing elements retained between the inner race and the outer race; and an output gear roller bearing including a plurality of roller bearing elements in rolling engagement with the outer ring on the second outer radial side, the clutch assembly axially moveable relative to the output gear roller bearing;

wherein the integrated inner ring-shaft extends between and to a first axial end and a second axial end, and the inner ring-shaft is axially retained by the output shaft at the first axial end and the second axial end.

2. The gear train of claim 1, wherein the output gear extends between and to an inner radial end and an outer radial end, the output gear includes the outer ring at the inner radial end, and the output gear includes a gear pattern at the outer radial end.

3. The gear train of claim 2, wherein the gear pattern is a spur gear pattern.

4. The gear train of claim 1, further comprising a gearbox housing, the gearbox housing houses the output shaft and the clutch assembly, and the output gear roller bearing is mounted on the gearbox housing.

5. The gear train of claim 4, further comprising a first output shaft bearing assembly, and the first output shaft bearing assembly includes a ball bearing mounted on and between the gearbox housing and the output shaft.

6. The gear train of claim 5, further comprising a second output shaft bearing assembly, and the second output shaft bearing assembly includes a roller bearing mounted on and between the gearbox housing and the output shaft.

7. The gear train of claim 1, wherein the plurality of clutch members includes a plurality of sprags.

8. The gear train of claim 1, wherein the clutch assembly includes two of the clutch ball bearing as a first clutch ball bearing and a second clutch ball bearing, and the clutch is disposed axially between the first clutch ball bearing and the second clutch ball bearing.

9. A gear train for an aircraft propulsion system, the gear train comprising:
- a gearbox housing;
- an output shaft mounted for rotation within the gearbox housing about a rotational axis; and
- a clutch assembly axially moveable relative to the gearbox housing, the clutch assembly including an output gear and a clutch,
  - the output gear extending circumferentially about the rotational axis, and
  - the clutch including a plurality of clutch members, the plurality of clutch members selectively coupling the output gear with the output shaft;
- a first output shaft bearing assembly mounted on the housing on a first axial side of the clutch assembly, the first output shaft bearing assembly rotationally supporting the output shaft; and
- a second output shaft bearing assembly mounted on the housing on a second axial side of the clutch assembly, opposite the first axial side, the second output shaft bearing assembly rotationally supporting the output shaft;
- wherein the clutch assembly further includes an intermediate shaft mounted on and circumscribing the output shaft, the intermediate shaft axially retained by the output shaft, wherein the plurality of clutch members are disposed between the intermediate shaft and the output gear to selectively couple the output gear with the output shaft through the intermediate shaft.

10. The gear train of claim 9, wherein the first output shaft bearing assembly includes a duplex ball bearing.

11. The gear train of claim 10, wherein the second output shaft bearing assembly includes a roller bearing.

12. The gear train of claim 9, wherein the output gear is a spur gear.

* * * * *